(12) United States Patent
Konishi et al.

(10) Patent No.: US 9,331,339 B2
(45) Date of Patent: May 3, 2016

(54) PERFORATED ALUMINIUM FOIL AND MANUFACTURING METHOD THEREOF

(75) Inventors: Atsushi Konishi, Osaka (JP); Masashi Mehata, Osaka (JP)

(73) Assignee: TOYO ALUMINIUM KABUSHIKI KAISHA, Osaka-shi (JP)

( * ) Notice: Subject to any disclaimer, the term of this patent is extended or adjusted under 35 U.S.C. 154(b) by 549 days.

(21) Appl. No.: 13/499,130

(22) PCT Filed: Sep. 22, 2010

(86) PCT No.: PCT/JP2010/066358
§ 371 (c)(1),
(2), (4) Date: May 17, 2012

(87) PCT Pub. No.: WO2011/040292
PCT Pub. Date: Apr. 7, 2011

(65) Prior Publication Data
US 2012/0219817 A1    Aug. 30, 2012

(30) Foreign Application Priority Data

Sep. 30, 2009  (JP) ................................. 2009-228365
Mar. 30, 2010  (JP) ................................. 2010-078849

(51) Int. Cl.
*C22C 21/00* (2006.01)
*C22F 1/00* (2006.01)
*H01M 4/66* (2006.01)
*C22F 1/04* (2006.01)
*H01G 11/68* (2013.01)
*H01G 11/70* (2013.01)

(52) U.S. Cl.
CPC ............... *H01M 4/661* (2013.01); *C22C 21/00* (2013.01); *C22F 1/00* (2013.01); *C22F 1/04* (2013.01); *H01G 11/68* (2013.01); *H01G 11/70* (2013.01); *Y02E 60/13* (2013.01); *Y10T 29/301* (2015.01); *Y10T 428/12361* (2015.01)

(58) Field of Classification Search
None
See application file for complete search history.

(56) References Cited

U.S. PATENT DOCUMENTS

2005/0112467 A1* 5/2005 Berkowitz et al. ........ 429/231.95
2010/0027193 A1* 2/2010 Marumo et al. .............. 361/505

FOREIGN PATENT DOCUMENTS

| JP | 63-145757 A | 6/1988 |
| JP | 6-306520 A | 11/1994 |
| JP | 8-260117 A | 10/1996 |

(Continued)

OTHER PUBLICATIONS

Aluminum 2024 specificaions, Aerospace Specifications Inc., Dec. 30, 2014.*

(Continued)

*Primary Examiner* — Adam Krupicka
(74) *Attorney, Agent, or Firm* — Fox Rothschild LLP

(57) ABSTRACT

An object of the present invention is to provide an aluminum foil having a plurality of through holes and a desired foil strength, and a manufacturing method thereof. The high-strength perforated aluminum foil of the present invention includes a plurality of through holes extending from a front surface to a back surface of the foil, and has: (1) a foil thickness of 50 μm or less; and (2) a tensile strength of [0.2×foil thickness (μm)] N/10 mm or more. The method of manufacturing a high-strength perforated aluminum foil of the present invention is characterized in that a perforated aluminum foil having a plurality of through holes is either embossed, or simultaneously stretched and bent.

10 Claims, 3 Drawing Sheets

(56) References Cited

FOREIGN PATENT DOCUMENTS

| | | |
|---|---|---|
| JP | 10-189396 A | 7/1998 |
| JP | 11-043749 A | 2/1999 |
| JP | 2004-207117 A | 7/2004 |
| JP | 2005-174949 A | 6/2005 |
| JP | 2007-141897 A | 6/2007 |
| JP | 2009-062594 A | 3/2009 |
| JP | 2009-062595 A | 3/2009 |
| WO | 20081078777 A1 | 7/2008 |
| WO | WO 2008078777 A1 * | 7/2008 |

OTHER PUBLICATIONS

Aluminum 6061 specificaions, Aerospace Specifications Inc., Dec. 30, 2014.*

Aluminum 7075 specificaions, Aerospace Specifications Inc., Dec. 30, 2014.*

* cited by examiner

PERFORATED ALUMINIUM FOIL AND MANUFACTURING METHOD THEREOF

The present application is the U.S. National Phase of International Patent Application Serial No. PCT/JP2010/066358, filed on Sep. 22, 2010, which claims priority to Japanese Patent Application Serial Nos. 2009-228365, filed Sep. 30, 2009, and 2010-078849, filed Mar. 30, 2010, both of which are hereby incorporated by reference in their entireties.

TECHNICAL FIELD

The present invention relates to a novel perforated aluminium foil. More specifically, the invention relates to a perforated aluminium foil suitably used for current collectors in lithium ion batteries, lithium ion capacitors, electric double-layer capacitors and the like.

BACKGROUND ART

Lithium ion batteries, lithium ion capacitors, electric double-layer capacitors and the like require a higher voltage to increase their energy density. To increase the energy density, it is preferable to reduce the potential of the negative electrode by using pre-doping techniques. For efficient pre-doping, the current collector needs to have through holes. Lithium ions can then move reversibly through the through holes of the current collector, so that the lithium ions can be intercalated in the negative electrode active materials.

Known methods of fabricating current collectors having through holes include, for example, punching, meshing, expanding, and netting techniques. The size of the through holes formed by these methods is typically 0.3 mm or more. However, forming through holes accordingly lowers the strength of the current collector, and this issue of reduced strength is more significant with such a relatively large hole diameter.

To deal with this, electrodes or the like using current collectors having relatively fine through holes have been proposed. For example, a lithium ion capacitor is known, which includes a positive electrode made of a material capable of reversibly intercalating lithium ions and/or anions, a negative electrode made of a material capable of reversibly intercalating lithium ions, and electrolytic made of a solution of lithium salt in a non-protonic organic solvent, wherein (1) the negative and/or positive electrodes are doped with lithium ions by an electrochemical contact between the positive and/or negative electrodes and a lithium ion source; (2) the positive electrode has a potential of 2.0 V or less after short-circuited to the negative electrode; and (3) the positive and/or negative electrodes has/have a current collector made of a metal foil having a plurality of holes extending through the front and the back sides, these through holes having an average diameter of inscribed circles of 100 μm or less (Patent Document 1).

Also known is a coated electrode including an electric collector made of an aluminium foil having a plurality of through holes extending through the front and back sides with a thickness of 20 to 45 μm, an apparent density of 2.00 to 2.54 g/cm$^3$, and an air permeability of 20 to 120 s, and an electrode layer formed by applying a coating on this electric collector, the coating containing a material capable of reversibly intercalating lithium ions and anions as an active material, wherein 80% or more of the through holes of the electric collector have a hole diameter of 1 to 30 μm (Patent Document 2). Aluminium foils for electrolytic capacitors having aligned crystal orientation are also known (for example, Patent Documents 3 and 4).

However, if formed with a plurality of through holes, aluminium foils would inevitably have a lower strength. This also applies to the conventional techniques mentioned above, and as a result of reduced foil strength due to the formation of through holes, there is a risk that the foil may break or wrinkle during a subsequent step where active materials are coated on the aluminium foil. Even if the coating were achieved successfully, the aluminium foil in the end product would be prone to break upon an impact applied to the product. The smaller the aluminium foil thickness, the more serious these issues would be.

Meanwhile, batteries and capacitors are highly demanded to be lighter and smaller in addition to the demands for higher energy density and higher output density. With these demands, current collectors are desired to be thinner.

Patent Document 1: Japanese Patent Application Publication No. 2007-141897
Patent Document 2: WO2008/078777
Patent Document 3: Japanese Patent Application Publication No. 2009-62595
Patent Document 4: Japanese Patent Application Publication No. 2005-174949

While formation of a large number of through holes is desired for enhancing the performance as current collectors or the like, this will likely lead to reduction in foil strength, which in turn may cause troubles in subsequent processes. There are methods for increasing the strength of foil subjected to etching such as adding alloying elements (for example Fe, Cu, Mn, Mg, Ti) or adjusting heat treatment conditions, none of which, however, can be called the best since these methods all inhibit etching. Inhibiting etching here refers to etch pits stopped from growing, or excessive dissolution where normal dissolution cannot be maintained. With a conventional high-strength aluminium foil, typically 3003 or the like, it is difficult to control formation of pits such that a large number of pits extend from a front surface to a back surface. The foil could be processed somehow before the etching to provide strength, but this method will inhibit formation or growth of etch pits, which results in poorer balance between strength and air permeability.

Under the circumstances, as described above, aluminium foil that can exhibit desired foil strength despite a large number of through holes is yet to be developed.

SUMMARY OF THE INVENTION

Accordingly, a main object of the present invention is to provide an aluminium foil having a plurality of through holes and a desired foil strength.

Through vigorous research in view of the problems in the conventional techniques, the present inventors have found out that the above object can be achieved by subjecting aluminium foil having through holes to predetermined processing, thus completing the present invention.

Namely, the present invention relates to the following perforated aluminium foil and manufacturing method thereof.

1. A perforated aluminium foil including a plurality of through holes extending from a front surface to a back surface of the foil, characterized by having:
   (1) a foil thickness of 50 μm or less; and
   (2) a breaking strength of [0.2×foil thickness (μm)] N/10 mm or more.
2. The high-strength perforated aluminium foil set forth in paragraph 1, having a breaking strength of [0.3×foil thickness (μm)] N/10 mm or more.

3. The high-strength perforated aluminium foil set forth in paragraph 1, having an elongation of [0.05×foil thickness (μm)]% or less.

4. The high-strength perforated aluminium foil set forth in paragraph 1, having a through hole density of $1×10^4/cm^2$ or more.

5. The high-strength perforated aluminium foil set forth in paragraph 1, having a ratio of yield strength to breaking strength of 50% or more.

6. The high-strength perforated aluminium foil set forth in paragraph 1, having an air permeability of 5 sec/100 ml or more as measured by an air permeability test using a Gurley type densometer according to JIS-P-8117.

7. The high-strength perforated aluminium foil set forth in paragraph 1, having through holes with an average inner diameter of 0.2 to 5 μm.

8. The high-strength perforated aluminium foil set forth in paragraph 1, having a surface-area increase ratio of [0.10×foil thickness (μm)] or more.

9. The high-strength perforated aluminium foil set forth in paragraph 1, having a composition formed of 5 to 80 ppm by weight of Fe, 5 to 100 ppm by weight of Si, 10 to 100 ppm by weight of Cu, and the remainder of Al and incidental impurities.

10. The high-strength perforated aluminium foil set forth in paragraph 1, having a ratio [c/t] of a percentage of volume occupied by vertical through holes c (%) to the foil thickness t (μm) of 1.4 or more.

11. A method of manufacturing the high-strength perforated aluminium foil set forth in paragraph 1, including a step of embossing a perforated aluminium foil having a plurality of through holes extending from a front surface to a back surface of the foil.

12. A method of manufacturing the high-strength perforated aluminium foil set forth in paragraph 1, including a step of simultaneously stretching and bending a perforated aluminium foil having a plurality of through holes extending from a front surface to a back surface of the foil.

ADVANTAGES OF THE INVENTION

According to the perforated aluminium foil of the present invention, an aluminium foil having a plurality of through holes and a desired foil strength can be provided.

The perforated aluminium foil according to Embodiment 1, in particular, has a plurality of through holes and a foil thickness of as small as 50 μm or less (in particular 25 μm or less), and at the same time excellent characteristics such as a tensile strength of [0.3×foil thickness (μm)] N/10 mm or more, and a breaking elongation of [0.05×foil thickness (μm)]% or less, so that the foil can exhibit functions as current collectors or the like as well as enables subsequent process steps to be performed smoothly. Namely, the Al foil of the present invention can effectively prevent occurrence of wrinkles or the like in the coating process so that smooth post-processing is possible. For example, coating of a paste or the like containing electrode active materials can be carried out smoothly and trouble-free.

Embodiment 2 can provide a perforated aluminium foil having, even with a small foil thickness of 50 μm or less (in particular 25 μm or less), a sufficient number of through holes for exhibiting excellent characteristics as current collectors or the like, as well as a strength that enables subsequent process steps to be performed smoothly. Namely, the high-strength perforated aluminium foil of the present invention can exhibit excellent characteristics such as a tensile strength of [0.2×foil thickness (μm)] N/10 mm or more, and a ratio of yield strength to tensile strength ([yield strength/tensile strength]) of 50% or more.

Such perforated aluminium foils can be suitably used as current collectors in, for example, lithium ion batteries, lithium ion capacitors, and electric double-layer capacitors or the like. The perforated aluminium foil of the present invention is particularly useful as the current collector of a lithium ion capacitor or a lithium ion secondary battery comprising 1) a positive electrode made of a material capable of reversibly intercalating lithium ions and/or anions, 2) a negative electrode made of a material capable of reversibly intercalating lithium ions, and 3) an electrolytic solution containing lithium ions, the lithium ions being doped in the positive electrode and/or negative electrode.

MODES FOR CARRYING OUT THE INVENTION

The high-strength perforated aluminium foil according to the present invention (Al foil of the present invention) is a perforated aluminium foil including a plurality of through holes extending from a front surface to a back surface of the foil, having:

(1) a foil thickness of 50 μm or less; and
(2) a tensile strength of [0.2×foil thickness (μm)] N/10 mm or more.

Figure 1:
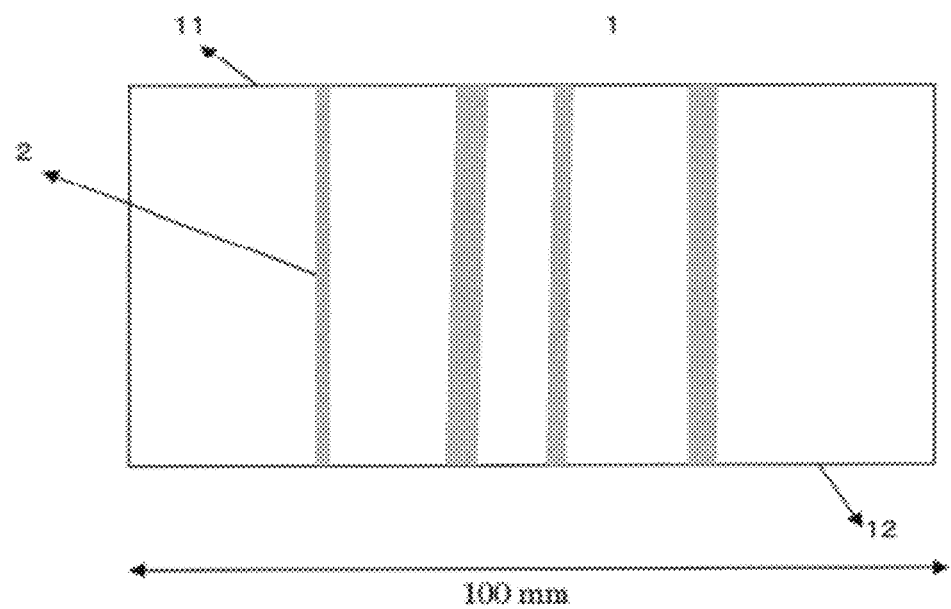
FIG. 1 is a model diagram illustrating a cross section of an aluminium foil having through holes.

The Al foil of the present invention has a plurality of through holes extending from the front surface to the back surface of the foil. FIG. 1 shows a model diagram of a cross section of the Al foil 1 of the present invention. For example, as shown in FIG. 1, the Al foil of the present invention includes a plurality of through holes 2 extending from the front surface 11 of the foil to the back surface 12 thereof. Such through holes can be formed by an etching process. Preferred embodiments 1 and 2 of the present invention will be hereinafter described as typical examples.

A. Embodiment 1

(A-1) Al Foil According to Embodiment 1

The Al foil according to Embodiment 1 is a perforated aluminium foil including a plurality of through holes extending from a front surface to a back surface of the foil, having:

(1) a foil thickness of 50 μm or less;
(2) a tensile strength of [0.3×foil thickness (μm)] N/10 mm or more; and
(3) a breaking elongation of [0.05×foil thickness (μm)]% or less.

Through Holes

The inside diameter of the through holes can be suitably set in accordance with the applications and purposes of use of the Al foil. Typically, it is preferable that the thickness be 0.2 to 5 µm, and in particular 0.5 to 3 µm. The inside diameter of the through holes can be suitably controlled by adjusting the etching conditions, particularly etching time, during the etching process.

The density of through holes may preferably be, but not particularly limited to, such that typically the foil has an air permeability of 5 sec/100 ml or more, in particular 20 sec/100 ml or more, as determined by an air permeability test method using a Gurley type densometer according to JIS-P-8117. Having such an air permeability provides the effect of obviating a pretreatment as a countermeasure against active materials going through the foil and transferring to unwanted parts when coated on the Al foil of the present invention. The upper limit of the air permeability may typically be, but not particularly limited to, about 500 sec/100 ml.

The Al foil of the present invention has a ratio [c/t] of the percentage of volume occupied by vertical through holes c (%) in the perforated aluminium foil to the foil thickness t (µm) of 1.4 or more, preferably 1.5 or more, and more preferably 1.6 or more. This indicates that the Al foil of the present invention has a higher percentage of volume occupied by vertical through holes than conventional perforated aluminium foil having the same thickness. Namely, the Al foil of the present invention has a higher percentage of volume occupied by vertical through holes even though the foil has a smaller thickness. Generally, the volume fraction of cube texture component (or the percentage of volume occupied by cube-oriented grains) of high-purity aluminium foil decreases as it is made thinner, and so does the percentage of volume occupied by vertical through holes. It is said that generally the fraction of the texture component corresponds approximately to the value of the foil thickness (µm). For example, aluminium foil with a thickness of 55 µm would have a volume fraction of the texture components of approximately 55%. In contrast, in the present invention, even though the foil is thin, higher volume fraction of the texture component can be achieved compared with conventional techniques by controlling the contents of Fe, Si, Cu, and the like, so that the percentage of volume occupied by vertical through holes can be made higher.

The actual percentage of volume occupied by vertical through holes of the Al foil of the present invention is not limited to a particular range as it varies in accordance with the foil thickness etc. Typically, preferable ranges are 30 to 98%, and in particular 40 to 98%.

In general, the ratio of through holes making an angle of 70 to 110 degrees from a horizontal plane is substantially equal to the volume fraction of cube texture component of the aluminium foil prior to etching. Therefore, in the present invention, through holes making an angle in the range of 70 to 110 degrees (i.e., 90±20 degrees) from a horizontal plane are considered as vertical through holes, and the ratio of vertical through holes to the total number of through holes is referred to as the "percentage of volume occupied by vertical through holes". Thus, the percentage of volume occupied by vertical through holes in the present invention is substantially equal to the percentage of volume occupied by cube-oriented crystals of the aluminium foil prior to etching.

The Al foil of the present invention should preferably have a surface-area increase ratio of [0.10×foil thickness t (µm)] or more, and in particular [0.15×foil thickness t (µm)] or more. With the surface-area increase ratio being set in the range noted above, the Al foil of the present invention will have better adhesion with active materials as the current collector.

The density of through holes in the Al foil of the present invention should preferably be, but not limited to, typically $1 \times 10^4$/cm² or more, and more preferably, in particular, $5 \times 10^4$/cm² or more. With the density of through holes being $1 \times 10^4$/cm² or more, for example, delays in the pre-doping process can effectively be prevented.

Foil Thickness

The thickness of the Al foil of the present invention is typically 50 µm or less, preferably 40 µm or less, and more preferably 25 µm or less. With the thickness being set as described above, the foil can suitably be used as the current collector of a lithium ion capacitor. The lower limit of the thickness may typically be, but not limited to, about 1 µm. Note, the "foil thickness" in the present invention refers to the thickness of a portion that has not been subjected to the embossing process to be described later.

Embossed Foil Thickness

Figure 4:
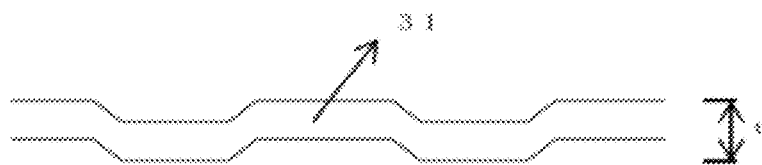
FIG. 4 is a model diagram indicating a total thickness t of an embossed foil.

The thickness of the embossed foil of the present invention is typically 95 µm or less, and preferably 90 µm or less. With the thickness being set as described above, the foil can suitably be used as the current collector of a lithium ion capacitor. The lower limit of the thickness may typically be, but not limited to, about 1.3 µm. Note, the "embossed foil thickness" in the present invention refers to the total thickness t of embossed Al foil 31 including the height (depth) of the embossed shape as shown in FIG. 4.

Tensile Strength and Elongation

The Al foil of the present invention has a tensile strength of [0.3×foil thickness (µm)] N/10 mm or more, and more preferably [0.35×foil thickness (µm)] N/10 mm or more. For example, the Al foil of the present invention with a foil thickness of 50 µm has a tensile strength of 15 N/10 mm or more. Tensile strength generally reduces with a decrease in the foil thickness. However, the degree of reduction is low with the foil of the present invention so that the foil shows a higher tensile strength than a conventional product of the same foil thickness. The Al foil of the present invention with a thickness of 30 to 50 µm has a relatively high tensile strength of about 8 to 15 N/10 mm or more, and may have an even higher tensile strength. The upper limit of the tensile strength may typically be, but not limited to, about 50 N/10 mm for a foil thickness range not exceeding 50 µm, and about 25 N/10 mm for a foil thickness range not exceeding 25 µm.

The Al foil of the present invention has a breaking elongation of [0.05×foil thickness (µm)]% or less, and more preferably [0.04×foil thickness (µm)]% or less. If the breaking elongation exceeds [0.05×foil thickness (µm)]%, there will be issues such as the foil easily wrinkled during coating and burrs easily formed at edges during punching. In this regard, setting the breaking elongation in the range noted above provides the effect of making the foil less prone to wrinkle during coating and less prone to form burrs at edges during punching.

Composition

The composition of the Al foil of the present invention is not limited as long as it has the characteristics described above, and compositions of known Al foils can also be employed. In particular, a composition formed of 5 to 80 ppm by weight of Fe, 5 to 100 ppm by weight of Si, 10 to 100 ppm by weight of Cu, and the remainder of Al and incidental impurities can preferably be employed.

The content of Fe is typically about 5 to 80 ppm, and preferably 10 to 50 ppm. Fe crystallizes as an Al—Fe compound; it is an element that can improve rolling and elongation properties. Al—Fe compounds in a suitable amount make crystal grains finer at crystal nucleation sites and by the pinning effect, thereby improving the rolling properties of thin foils.

The profitable effects stated above cannot be achieved if the content of Fe is less than 5 ppm, in which case the larger size of crystal grains leads to a reduction in foil strength, resulting in the perforated foil having lower strength or variations in strength depending on location. On the other hand, if the content of Fe exceeds 80 ppm, the foil undergoes excessive dissolution on the surface, which leads to a reduction in strength of the perforated foil or variations in strength depending on location. Also, the volume fraction of cube texture is lowered, because of which a sufficient density of penetrating etch pits cannot be obtained.

The content of Si is typically about 5 to 100 ppm, and preferably 10 to 60 ppm. Si is an element that can primarily improve strength. For example, during rolling, a perforated thin aluminium foil having a thickness of 50 μm or less, in particular, experiences an instantaneous temperature rise associated with the rolling process not only on the surface but also inside, but the presence of silicon keeps the dislocations from annihilating thereby to prevent reduction in strength.

The profitable effects noted above cannot be achieved if the content of Si is less than 5 ppm, in which case the strength is lowered, which may lead to reduction in strength of perforated foil or variations in strength depending on location. If the content of Si exceeds 100 ppm, the volume fraction of cube texture is lowered, because of which a sufficient density of penetrating etch pits cannot be obtained.

The content of Cu is typically about 10 to 100 ppm, and preferably 15 to 60 ppm. With the Cu content being set in the range noted above, the rolling properties of foil when rolling the foil to 25 μm or less, in particular, can be enhanced. Cu also improves solubility during hydrochloric acid etching and contributes to formation of penetrating etch pits.

The effects noted above cannot be sufficiently achieved if the content of Cu is less than 10 ppm, and moreover the rolling properties of the thin foil are significantly lowered. On the other hand, if the content of Cu exceeds 100 ppm, the foil undergoes excessive dissolution on the surface, which leads to a reduction in strength of the perforated foil or variations in strength depending on location. Also, the percentage of volume occupied by cube-oriented crystals is lowered, because of which a sufficient density of penetrating etch pits cannot be obtained.

If necessary, the Al foil of the present invention may further include Pb in addition to the compositions described above. Pb has functions primarily of promoting reaction between electrolytic solution used for the etching process and aluminium foil and increasing the initial number of etch pits, so that an even higher density of penetrating etch pits can be achieved. If included in the foil, the content of Pb may typically be about 0.01 to 20 ppm, and preferably 0.05 to 10 ppm.

Pb has functions primarily of promoting reaction between electrolytic solution used for the etching process and aluminium foil and increasing the initial number of etch pits, so that an even higher density of penetrating etch pits can be achieved. In the case where the foil contains Pb, the content of Pb can be suitably adjusted to be able to achieve the effects described above. Typically, the Pb content should be about 0.01 to 20 ppm, and preferably 0.05 to 10 ppm.

In particular, in the Al foil of the present invention, the content of Pb should desirably be in the range of 40 to 2000 ppm in a region from the surface to a depth of 0.1 μm of the aluminium foil. With the Pb content being set within the range noted above, the density of penetrating etch pits can be increased even more.

Such adjustment of the Pb content can be achieved, for example, by adjusting the amount of Pb added to aluminium molten during the production process of aluminium foil, and further by controlling the annealing temperature to be 450° C. or more.

The remainder is substantially formed of Al and incidental impurities. The purity of aluminium of the aluminium alloy foil of the present invention is not particularly limited as long as it is within the range usable as current collectors. Incidental impurities may include, for example, Mg, Mn, Zn, Ti, V, Ga, Cr, Zr, B, and the like.

(A-2) Method of Manufacturing a High-Strength Perforated Aluminium Foil According to Embodiment 1

Al foil of Embodiment 1 can be manufactured as follows. Namely, the Al foil according to Embodiment 1 can favorably be manufactured by a method of manufacturing a high-strength perforated aluminium foil including a step (process of the present invention) of embossing a perforated aluminium foil having a plurality of through holes extending from a front surface to a back surface of the foil.

The perforated aluminium foil (raw foil) may be prepared by known methods, but should desirably be prepared, in particular, in accordance with the following method.

First, from casting to plate rolling (to about 1 mm), the foil can be produced substantially through known methods. For example, molten raw materials of the composition mentioned above are prepared and solidified to produce ingots. In this case, the ingots thus obtained should preferably be subjected to heat treatment for uniformization at 400 to 550° C. for about 1 to 20 hours. In the present invention, in particular, the temperature of the uniformization treatment should desirably be 550° C. or less. With the uniformization treatment temperature being 550° C. or less, a higher percentage of volume occupied by cube-oriented crystals can be obtained after the foil is rolled to 50 μm or less and annealed.

After that, the ingots are hot-rolled and cold-rolled to a heavy gauge strip of about 350 μm. Known treatments such as plate cleaning and foil cleaning may be performed as required for removing impurities or oxide films from the plate surface, or for other purposes.

Next, the heavy gauge strip is cold-rolled to obtain thin foil. In this case, the thin foil after the rolling should preferably have a thickness of 110 to 130% of that of final foil. The temperature itself during cold rolling may be set similarly to that of known cold rolling techniques. Cold rolling may be performed, for example, in a temperature range not exceeding 120° C.

During the rolling, the thin aluminium foil experiences an instantaneous temperature rise associated with the rolling process not only on the surface but also inside. Also, an increase in mechanical stress such as friction between the aluminium foil and rolling rolls may lead to a lower percentage of volume occupied by cube-oriented crystals after the foil is rolled to 50 μm or less and annealed. Therefore, the rolls for rolling the thin foil (at least for final rolling, i.e., rolling for obtaining a final foil) should preferably have a rolling surface with an average roughness Ra of 0.25 μm or less, in particular, 0.20 μm or less, and more preferably 0.18 μm or less. In this case, the rolled thin foil will have an average roughness Ra of 0.25 μm or less, in particular, 0.20 μm or less, and further 0.18 μm or less, respectively, on the face that made contact with the rolls.

In the present invention, when rolling a heavy gauge strip of foil to obtain thin foil, it is preferable to ensure that the foil has one side not contacting the rolls when rolled. With one side not contacting the rolls, factors that inhibit the growth of crystal grains can be removed, whereby the foil can have a higher percentage of volume occupied by cube-oriented crystals despite the small thickness. To make one side that does not contact the rolls, for example, so-called double pay rolling (overlapping rolling) is preferable. Namely, two or more foils are overlapped and rolled together, whereby thin foils having one side not contacting the rolls can be obtained. In this case, the total thickness of the overlapped foils should preferably be 350 μm or less, in order to obtain final thin foils of a uniform thickness. The overlapped foils can be separated before and/or after the subsequent annealing step. In such double pay rolling, too, the rolls should preferably have a rolling surface with an average roughness Ra of 0.25 μm or less, in particular, 0.20 μm or less, and more preferably 0.18 μm or less.

After the cold rolling described above, the foil should preferably be subjected to heat treatment at 150 to 350° C. (in particular 150 to 300° C.) for about 1 to 30 hours as intermediate annealing. In particular, the temperature of the heat treatment should desirably be 350° C. or less. With the heat treatment temperature being 350° C. or less, a higher percentage of volume occupied by cube-oriented crystals can be obtained after the foil is rolled to 50 μm or less and annealed. The atmospheres for the intermediate annealing may include, but not limited to, vacuum, atmosphere, and inert gas atmosphere, for example.

Next, the thin foil is further cold-rolled to a final foil having a desired foil thickness (foil having a final foil thickness). Namely, a foil with a foil thickness of 50 μm or less can be obtained by this cold rolling. In this cold rolling, too, the rolls should preferably have a rolling surface with an average roughness Ra of 0.25 μm or less, in particular, 0.20 μm or less, and more preferably 0.18 μm or less.

In the present invention, it is preferable to perform annealing (final annealing step) to the final foil. Foil cleaning may be performed for the purpose of removing, for example, rolling lubricant, impurities, or oxide films from the foil surface, prior to the annealing step. Drying may be performed as required after the cleaning. High-temperature annealing with rolling lubricant adhered excessively may cause the foil to suffer yellowing in parts like stains on the surface, which may inhibit the formation of etch pits of a desired configuration in the etching process.

The annealing temperature should desirably be, but not limited to, 450° C. or more, in particular, 450° C. or more and less than 660° C., and further, 500 to 620° C. An annealing temperature of less than 450° C. may lower cube-oriented grains rate and inhibit the formation of etch pits of a desired configuration in the etching process. Annealing time depends on the annealing temperature etc but may typically be about 1 to 100 hours.

Annealing atmosphere should desirably be substantially vacuum or inert gas atmosphere. However, if the temperature exceeds 350° C. during the process including the temperature increasing and decreasing steps, it is desirable to reduce the oxygen density of the annealing atmosphere to the industrially possible extent. Namely, the atmosphere should be at a pressure of $10^{-5}$ Torr or less, or should be an inert gas atmosphere containing 0 to 1 volume % of oxygen. If the annealing atmosphere is a vacuum atmosphere with a pressure of more than $10^{-5}$ Torr, or an inert gas atmosphere with an oxygen density of more than 1.0 volume %, the foil after the annealing may suffer yellowing in parts like stains on the surface, which may inhibit the formation of etch pits of a desired configuration in the etching process. With the oxygen density of the annealing atmosphere being set as described above, thin and uniform thermal oxide films are formed, which can contribute to control of air permeability.

The foil (final foil) thus obtained is subjected to an etching process to form through holes. The etching process is not limited to a particular method. A single stage etching may be performed to form desired through holes, or the etching may be performed in two or more stages.

In this embodiment, for example, at least two stages of etching may be performed, to form through holes in the first stage and to adjust the inner diameter of the through holes in the second stage, to form desired through holes in a favorable manner.

In this case, the first stage etching should preferably be DC etching using an electrolytic solution mainly composed of hydrochloric acid. In the first stage etching, primarily, etch pits may be formed, as well as their density and shape (penetration shape) may be controlled. A 1 to 10 weight % aqueous solution of hydrochloric acid may be used as the electrolytic solution. In this case, the electrolytic solution may contain 0.001 to 0.1 weight % of oxalic acid, phosphoric acid, sulfuric acid, and the like. The solution temperature may be about 60 to 90° C., and the current density May be about 0.1 to 0.5 A/cm². A preferable etching method is DC etching. The etching time may be suitably set in accordance with the foil thickness and target air permeability etc.

In the second stage etching, preferably, chemical etching is performed. This is primarily for the etch pit diameter to be controlled. Chemical etching may be performed, for example, in a solution of the same composition at the same temperature as those of the first stage etching. The etching time may be suitably set in accordance with the foil thickness and target air permeability etc. The electrolytic solution may contain nitric acid as the main component thereof instead of hydrochloric acid. Also, electrolytic etching may be performed instead of chemical etching. Further, chemical etching, electrolytic etching, and etching solution compositions may be variously combined to further divide the "second stage etching" into multiple stages as necessary.

The process of the present invention is carried out using the raw foil obtained as described above. Namely, the raw foil is embossed. In this case, while the foil thickness of the raw foil may change somewhat after the process of the present invention as long as the through holes are substantially kept, the rate of change in foil thickness, in particular, should preferably be 10% or less, particularly 5% or less, and further 1% or less. Namely, it is most preferable to emboss the raw foil while substantially maintaining the thickness of the raw foil. The rate of change is controlled to be within the range noted above since, if the thickness of the raw foil changed largely (in particular, reduced largely), the through holes would be deformed and the desired air permeability or the like could not be achieved.

Generally, raw aluminium foil is subjected to heat treatment (annealing) before etching to achieve complete recrystallization and preferably to cause each recrystallized grain to penetrate the foil cross section, in order for etch pits to grow from the foil surface inwards all the way to the opposite side. Such recrystallization significantly lowers the strength of aluminium foil and deteriorates the handling properties of the product processed to thin foil. According to the present invention, the raw foil is subjected to etching to provide penetration properties and then embossed to increase the tensile strength etc and to improve the handling properties, thereby to reduce occurrence of breaks or wrinkles in the foil. Since the heat treatment mentioned above needs to be performed at high temperature of 400° C. or more, the aluminium foil before etching typically has a tensile strength of about 50 N/mm² or less, and a yield strength of about 20 N/mm² or less. To avoid reduction in these values, elements such as, for example, Fe, Si, or Cu may be added (for alloying) to enhance the strength. However, strength improvement by alloying is practically difficult since these elements cannot be added in a large amount as they inhibit etching. In this regard, with the process of the present invention, the foil strength can be improved without much affecting air permeability etc by subjecting the raw foil after etching to light processing. Namely, relatively light embossing is performed to introduce processing strain to enhance the yield strength. Since the handling properties of thin foils are substantially determined by the yield strength, increasing the yield strength can improve the handling properties.

In the present invention, the embossing process is not limited to a particular method as long as the rate of change in foil thickness is kept 10% or less as mentioned above, and any known or commercially available embossing machines may be used to carry it out. For example, the perforated aluminium foil may be passed through between two rolls, at least one of them having an embossing pattern, to transfer the embossing pattern on the roll onto the surface of the perforated aluminium foil, whereby an embossing (convex and concave) pattern can be provided to the surface of the perforated aluminium foil. The embossing pattern may be provided by rolls on one side, or on both sides, but in the present invention, one-sided embossing is preferable. For example, a combination of a metal roll having an embossing pattern and a plastic roll without an embossing pattern may preferably be employed.

The mesh number of the roll's embossing pattern which is typically in a range of 50 to 225 may be suitably set in accordance with the desired strength or the like. For example, if the foil thickness is 30 to 50 µm, the mesh number should preferably be 50 to 200, and in particular 100 to 200. Various shapes may be adopted for the embossing pattern shape (convex and concave shape). For example, any of trapezoidal (trapezoid cups), pyramid (pyramid triangular) (pyramid-shaped cups), hexagonal, diagonal triangles, diagonal trapezoids, or other patterns used in the rolls of known or commercially available machines may be employed. The height (depth) of the embossed shape may be suitably set within a range equal to or less than the thickness of the aluminium foil. In particular, the height should preferably be set within the range of 60 to 90%, in particular 60 to 80% of the thickness of the aluminium foil. Pressure may be suitably adjusted such that the rate of change in foil thickness of the perforated aluminium foil will remain 10% or less as described above. Typically, it may be within the range of 1 to 15 kg/cm$^2$.

B. Embodiment 2

(B-1) Al Foil According to Embodiment 2

The high-strength perforated aluminium foil according to Embodiment 2 (Al foil of the present invention) is a perforated aluminium foil including a plurality of through holes extending from a front surface to a back surface of the foil, having:

(1) a foil thickness of 50 µm or less;
(2) a tensile strength of [0.2×foil thickness (µm)] N/10 mm or more; and
(3) a ratio of yield strength to tensile strength of 50% or more.

Through Holes

The inside diameter of the through holes can be suitably set in accordance with the applications and purposes of use of the Al foil. Typically, it is preferable that the thickness be 0.2 to 5 µm, and in particular 0.5 to 3 µl. The inside diameter of the through holes can be suitably controlled by adjusting the etching conditions, particularly etching time, during the etching process.

The abundance of through holes may preferably be, but not particularly limited to, such that typically the foil has an air permeability of 5 sec/100 ml or more, in particular 30 sec/100 ml or more, as determined by an air permeability test method using a Gurley type densometer according to JIS-P-8117. Having such an air permeability provides the effect of obviating a pretreatment as a countermeasure against active materials going through the foil and transferring to unwanted parts when coated on the Al foil of the present invention. The upper limit of the air permeability may typically be, but not particularly limited to, about 500 sec/100 ml.

The Al foil of the present invention has a ratio [c/t] of the percentage of volume occupied by vertical through holes c (%) in the perforated aluminium foil to the foil thickness t (µm) of 1.4 or more, preferably 1.5 or more, and more preferably 1.6 or more. This indicates that the Al foil of the present invention has a higher percentage of volume occupied by vertical through holes than conventional perforated aluminium foil of the same thickness. Namely, the Al foil of the present invention has a higher percentage of volume occupied by vertical through holes even though the foil has a smaller thickness. Generally, the percentage of volume occupied by cube-oriented crystals of high-purity aluminium foil decreases as it is made thinner, and so does the percentage of volume occupied by vertical through holes. It is said that generally the volume fraction of the cube texture component or the percentage % of volume occupied by cube-oriented grains corresponds approximately to the value of the foil thickness (µm). For example, aluminium foil with a thickness of 55 µm would have a volume fraction of the texture component of approximately 55%. In contrast, in the present invention, even though the foil is thin, a higher percentage of volume occupied by cube-oriented crystals can be achieved compared with conventional techniques by controlling the contents of Fe, Si, Cu, and the like, so that the percentage of volume occupied by vertical through holes can be made higher.

The actual percentage of volume occupied by vertical through holes of the Al foil of the present invention is not limited to a particular range as it varies in accordance with the foil thickness etc. Typically, preferable ranges are 30 to 98%, and in particular 40 to 98%.

In general, the ratio of through holes making an angle of 70 to 110 degrees from a horizontal plane is substantially equal to the volume fraction of the texture component of the aluminium foil prior to etching. Therefore, in the present invention, through holes making an angle in the range of 70 to 110 degrees (i.e., 90±20 degrees) from a horizontal plane are considered as vertical through holes, and the ratio of vertical through holes to the total number of through holes is referred to as the "percentage of volume occupied by vertical through holes". Thus, the percentage of volume occupied by vertical through holes in the present invention is substantially equal to the volume fraction of texture component of the aluminium foil prior to etching.

The Al foil of the present invention should preferably have a surface-area increase ratio of [0.15×foil thickness t (µm)] or more, and in particular [0.17×foil thickness t (µm)] or more. With the surface-area increase ratio being set in the range noted above, the Al foil of the present invention will have better adhesion with active materials as the current collector.

The Al foil of the present invention should preferably have a percentage of through holes s (%)=[measured weight (g)/[foil thickness (cm)×sample area (cm$^2$)]]/specific weight of aluminium (2.70 g/cm³) in a range of 5≤s≤20. The percentage set in the above range will allow reversible travel of lithium ions through the through holes, without causing much reduction in strength.

The thickness of the Al foil of the present invention is typically 50 μm or less, preferably 40 μm or less, and more preferably 25 μm or less. With the thickness being set as described above, the foil can suitably be used as the current collector of a lithium ion capacitor. The lower limit of the thickness may typically be, but not limited to, about 1 μm.

Tensile Strength and Yield Strength

The Al foil of the present invention has a tensile strength of [0.2×foil thickness (μm)] N/10 mm or more, and more preferably [0.25×foil thickness (μm)] N/10 mm or more. For example, the Al foil of the present invention with a foil thickness of 50 μm has a tensile strength of 10 N/10 mm or more. Tensile strength generally reduces with a decrease in the foil thickness. However, the degree of reduction is low with the foil of the present invention so that the foil shows a higher tensile strength than a conventional product of the same foil thickness. The Al foil of the present invention with a thickness of 30 to 50 μm has a relatively high tensile strength of about 8 to 15 N/10 mm or more, and may have an even higher tensile strength. The upper limit of the tensile strength may typically be, but not limited to, about 50 N/10 mm for a foil thickness range not exceeding 50 μm, and about 25 N/10 mm for a foil thickness range not exceeding 25 μm.

The Al foil of the present invention has a ratio of yield strength to tensile strength [yield strength/tensile strength] of 50% or more, and preferably 70% or more. If the ratio is less than 50%, the handling properties etc will be reduced, which may cause frequent breaking, wrinkling or the like of the foil in subsequent steps. The Al foil of the present invention typically has a yield strength (which generally refers to the stress required to cause elongation by 0.2% in material under a tensile test) of about 2 to 5 N/10 mm when the foil thickness is in a range of 30 to 50 μm, but those having yield strengths exceeding this range shall also be included in the present invention. According to the present invention, with such a high yield strength and the high ratio mentioned above, the handling properties are improved and occurrence of breaks or wrinkles in the foil is reduced.

Composition

The composition of the Al foil of the present invention is not limited as long as it has the characteristics described above, and compositions of known Al foils can also be employed. In particular, a composition formed of 5 to 80 ppm by weight of Fe, 5 to 100 ppm by weight of Si, 10 to 100 ppm by weight of Cu, and the remainder of Al and incidental impurities can preferably be employed.

The content of Fe is typically about 5 to 80 ppm, and preferably 10 to 50 ppm. Fe crystallizes as an Al—Fe compound; it is an element that can improve rolling and elongation properties. Al—Fe compounds in a suitable amount make crystal grains finer at crystal nucleation sites and by the pinning effect, thereby improving the rolling properties of thin foils.

The profitable effects noted above cannot be achieved if the content of Fe is less than 5 ppm, in which case the larger size of crystal grains leads to a reduction in foil strength, resulting in the perforated foil having lower strength or variations in strength depending on location. On the other hand, if the content of Fe exceeds 80 ppm, the foil undergoes excessive dissolution on the surface, which leads to a reduction in strength of the perforated foil or variations in strength depending on location. Also, the percentage of volume occupied by cube-oriented crystals is lowered, because of which a sufficient density of penetrating etch pits cannot be obtained.

The content of Si is typically about 5 to 100 ppm, and preferably 10 to 60 ppm. Si is an element that can primarily improve strength. For example, during rolling, a perforated thin aluminium foil of a thickness of 50 μm or less, in particular, experiences an instantaneous temperature rise associated with the rolling process not only on the surface but also inside, but the presence of silicon keeps the dislocations from annihilating thereby to prevent reduction in strength.

The effects noted above cannot be achieved if the content of Si is less than 5 ppm, in which case the strength is lowered, which may lead to reduction in strength of perforated foil or variations in strength depending on location. If the content of Si exceeds 100 ppm, the percentage of volume occupied by cube-oriented crystals is lowered, because of which a sufficient density of penetrating etch pits cannot be obtained.

The content of Cu is typically about 10 to 100 ppm, and preferably 15 to 60 ppm. With the Cu content being set in the range noted above, the rolling properties of foil when rolling the foil to 25 μm or less, in particular, can be enhanced. Cu also improves solubility during hydrochloric acid etching and contributes to formation of penetrating etch pits.

The effects noted above cannot be sufficiently achieved if the content of Cu is less than 10 ppm, and moreover the rolling properties of the thin foil are significantly lowered. On the other hand, if the content of Cu exceeds 100 ppm, the foil undergoes excessive dissolution on the surface, which leads to a reduction in strength of the perforated foil or variations in strength depending on location. Also, the volume fraction of cube texture is lowered, because of which a sufficient density of penetrating etch pits cannot be obtained.

The Al foil of the present invention may further include Pb according to needs in addition to the compositions described above. Pb has functions primarily of promoting reaction between electrolytic solution used for the etching process and aluminium foil and increasing the initial number of etch pits, so that an even higher density of penetrating etch pits can be achieved. If included in the foil, the content of Pb may typically be about 0.01 to 20 ppm, and preferably 0.05 to 10 ppm.

Pb has functions primarily of promoting reaction between electrolytic solution used for the etching process and aluminium foil and increasing the initial number of etch pits, so that an even higher density of penetrating etch pits can be achieved. In the case where the foil contains Pb, the content of Pb can be suitably adjusted to be able to achieve the effects described above. Typically, the Pb content should be about 0.01 to 20 ppm, and preferably 0.05 to 10 ppm.

In particular, in the Al foil of the present invention, the content of Pb should desirably be distributed in the range of 40 to 2000 ppm in a region from the surface to a depth of 0.1 μm of the aluminium foil. With the Pb content being set within the range noted above, the density of penetrating etch pits can be increased even more.

Such adjustment of the Pb content can be achieved, for example, by adjusting the amount of Pb added to aluminium molten during the production process of aluminium foil, and further by controlling the annealing temperature to be 450° C. or more.

The remainder is substantially formed of Al and incidental impurities. The purity of aluminium of the aluminium alloy foil of the present invention is not particularly limited as long as it is within the range usable as current collectors. Incidental impurities may include, for example, Mg, Mn, Zn, Ti, V, Ga, Cr, Zr, B, and the like.

(B-2) Method of Manufacturing a High-Strength Perforated Aluminium Foil According to Embodiment B Al foil of Embodiment B can be manufactured as follows. Namely, the Al foil of the present invention can favorably be manufactured by a method of manufacturing a high-strength perforated aluminium foil including a step (process of the present invention) of simultaneously stretching and bending a perforated aluminium foil having a plurality of through holes extending from a front surface to a back surface of the foil.

The perforated aluminium foil (raw foil) may be prepared by known methods, but should desirably be prepared, in particular, in accordance with the following method.

First, from casting to plate rolling (to about 1 mm), the foil can be produced substantially through common methods. For example, molten raw materials of the composition mentioned above are prepared and solidified to produce ingots. In this case, the ingots thus obtained should preferably be subjected to heat treatment for uniformization at 400 to 550° C. for about 1 to 20 hours. In the present invention, in particular, the temperature of the uniformization treatment should desirably be 550° C. or less. With the uniformization treatment temperature being 550° C. or less, a higher percentage of volume occupied by cube-oriented crystals can be obtained after the foil is rolled to 50 μm or less and annealed.

After that, the ingots are hot-rolled and cold-rolled to a heavy gauge strip of about 350 μm. Known treatments such as plate cleaning and foil cleaning may be performed as required for removing impurities or oxide films from the plate surface, or for other purposes.

Next, the heavy gauge strip is cold-rolled to obtain thin foil. In this case, the thin foil after the rolling should preferably have a thickness of 110 to 130% of that of final foil. The temperature itself during cold rolling may be set similarly to that of known cold rolling techniques. Cold rolling may be performed, for example, in a temperature range not exceeding 120° C.

During the rolling, the thin aluminium foil experiences an instantaneous temperature rise associated with the rolling process not only on the surface but also inside. Also, an increase in mechanical stress such as friction between the aluminium foil and rolling rolls may lead to a lower percentage of volume occupied by cube-oriented crystals after the foil is rolled to 50 μm or less and annealed. Therefore, the rolls for rolling the thin foil (at least for final rolling, i.e., rolling for obtaining a final foil) should preferably have a rolling surface with an average roughness Ra of 0.25 μm or less, in particular, 0.20 μm or less, and more preferably 0.18 μm or less. In this case, the rolled thin foil will have an average roughness Ra of 0.25 μm or less, in particular, 0.20 μm or less, and further 0.18 μm or less, respectively, on the face that made contact with the rolls.

In the present invention, when rolling a heavy gauge strip of foil to obtain thin foil, it is preferable to ensure that the foil has one side not contacting the rolls when rolled. With one side not contacting the rolls, factors that inhibit the growth of crystal grains can be removed, whereby the foil can have a higher percentage of volume occupied by cube-oriented crystals despite the small thickness. To make one side that does not contact the rolls, for example, so-called double pay rolling (overlapping rolling) is preferable. Namely, two or more foils are overlapped and rolled together, whereby thin foils having one side not contacting the rolls can be obtained. In this case, the total thickness of the overlapped foils should preferably be 350 μm or less, in order to obtain final thin foils of a uniform thickness. The overlapped foils can be separated before and/or after the subsequent annealing step. In such double pay rolling, too, the rolls should preferably have a rolling surface with an average roughness Ra of 0.25 μm or less, in particular, 0.20 μm or less, and more preferably 0.18 μm or less.

After the cold rolling described above, the foil should preferably be subjected to heat treatment at 150 to 350° C. (in particular 150 to 300° C.) for about 1 to 30 hours as intermediate annealing as necessary. In particular, the temperature of the heat treatment should desirably be 350° C. or less. With the heat treatment temperature being 350° C. or less, a higher percentage of volume occupied by cube-oriented crystals can be obtained after the foil is rolled to 50 μm or less and annealed. The atmospheres for the intermediate annealing may include, but not limited to, vacuum, atmosphere, and inert gas atmosphere, for example.

Next, the thin foil is further cold-rolled to a final foil having a desired foil thickness (foil having a final foil thickness). Namely, a foil with a foil thickness of 50 μm or less can be obtained by this cold rolling. In this cold rolling, too, the rolls should preferably have a rolling surface with an average roughness Ra of 0.25 μm or less, in particular, 0.20 μm or less, and more preferably 0.18 μm or less.

In the present invention, it is preferable to perform annealing (final annealing step) to the final foil. Foil cleaning may be performed for the purpose of removing, for example, rolling lubricant, impurities, or oxide films from the foil surface, prior to the annealing step. Drying may be performed as required after the cleaning. High-temperature annealing with rolling lubricant adhered excessively may cause the foil to suffer yellowing in parts like stains on the surface, which may inhibit the formation of etch pits of a desired configuration in the etching process.

The annealing temperature should desirably be, but not limited to, typically 450° C. or more, in particular, 450° C. or more and less than 660° C., and further, 500 to 620° C. An annealing temperature of less than 450° C. may lower cube-oriented crystals rate and inhibit the formation of etch pits of a desired configuration in the etching process. Annealing time depends on the annealing temperature etc but may typically be about 1 to 100 hours.

Annealing atmosphere should desirably be substantially vacuum or inert gas atmosphere. However, if the temperature exceeds 350° C. during the process including the temperature increasing and decreasing steps, it is desirable to reduce the oxygen density of the annealing atmosphere to the industrially possible extent. Namely, the atmosphere should be at a pressure of 10 Torr or less, or should be an inert gas atmosphere containing 0 to 1 volume % of oxygen. If the annealing atmosphere is a vacuum atmosphere with a pressure of more than $10^{-5}$ Torr, or an inert gas atmosphere with an oxygen density of more than 1.0 volume %, the foil after the annealing may suffer yellowing in parts like stains on the surface, which may inhibit the formation of etch pits of a desired configuration in the etching process. With the oxygen density of the annealing atmosphere being set as described above, thin and uniform thermal oxide films are formed, which can contribute to control of air permeability.

The foil (final foil) thus obtained is subjected to an etching process to form through holes. The etching process is not limited to a particular method. A single stage etching may be performed to form desired through holes, or the etching may be performed in two or more stages.

In this embodiment, for example, at least two stages of etching may be performed, to form through holes in the first stage and to adjust the inner diameter of the through holes in the second stage, to form desired through holes in a favorable manner.

In this case, the first stage etching should preferably be DC etching using an electrolytic solution mainly composed of hydrochloric acid. In the first stage etching, primarily, etch pits may be formed, as well as their density and shape (penetration shape) may be controlled. A 1 to 10 weight % aqueous solution of hydrochloric acid may be used as the electrolytic solution. In this case, the electrolytic solution may contain 0.001 to 0.1 weight % of oxalic acid, phosphoric acid, sulfuric acid, and the like. The solution temperature may be about 60 to 90° C., and the current density may be about 0.1 to 0.5 A/cm². A preferable etching method is DC etching. The etching time may be suitably set in accordance with the foil thickness and target air permeability etc.

In the second stage etching, preferably, chemical etching is performed. This is primarily for the etch pit diameter to be controlled. Chemical etching may be performed, for example, in a solution of the same composition at the same temperature as those of the first stage etching. The etching time may be suitably set in accordance with the foil thickness and target air permeability etc. The electrolytic solution may contain nitric acid as the main component thereof instead of hydrochloric acid. Also, electrolytic etching may be performed instead of chemical etching. Further, chemical etching, electrolytic etching, and etching solution compositions may be variously combined to further divide the "second stage etching" into multiple stages as necessary.

The process of the present invention is carried out using the raw foil obtained as described above. Namely, the raw foil is stretched and bent simultaneously. In this case, while the foil thickness of the raw foil may change somewhat after the process of the present invention as long as the through holes are substantially kept, the rate of change in foil thickness, in particular, should preferably be 5% or less, particularly 1% or less, and further 0%. Namely, it is most preferable to stretch and bend the raw foil simultaneously while substantially maintaining the thickness of the raw foil. The rate of change is controlled to be within the range noted above since, if the thickness of the raw foil changed largely (in particular, reduced largely), the through holes would be deformed and the desired air permeability or the like could not be achieved.

Generally, raw aluminium foil is subjected to heat treatment (annealing) before etching to achieve complete recrystallization and preferably to cause each recrystallized grain to penetrate the foil cross section, in order for etch pits to grow from the foil surface inwards all the way to the opposite face. Such recrystallization significantly lowers the strength of aluminium foil and deteriorates the handling properties of the product processed to thin foil. According to the present invention, the raw foil is subjected to etching to provide penetration properties and then to stretching and bending simultaneously to increase the yield strength and to improve the handling properties, thereby to reduce occurrence of breaks or wrinkles in the foil. Since the heat treatment mentioned above needs to be performed at high temperature of 400° C. or more, the aluminium foil before etching typically has a breaking strength of about 50 N/mm² or less, and a yield strength of about 20 N/mm² or less. To deal with reduction in these values, elements such as, for example, Fe, Si, or Cu may be added (for alloying) to enhance the strength. However, strength improvement by alloying is practically difficult since these elements cannot be added in a large amount as they inhibit etching. In this regard, with the process of the present invention, the foil strength can be improved without much affecting air permeability etc by subjecting the raw foil after etching to light processing. Namely, relatively light stretching and bending are performed to introduce processing strain to enhance the yield strength. Since the handling properties of thin foils are substantially determined by the yield strength, increasing the yield strength can improve the handling properties.

The process of stretching and bending simultaneously is not limited to a particular method, and known processing methods (processing machines) may be used alone or in combination. Examples include processings using a pressing machine, a rolling machine, or a stretcher. The raw foil is processed using these methods, and the foil thickness may be monitored to adjust the processing degree. In this case, the degree of processing should preferably be adjusted to a light level, as a desired air permeability or the like may become unattainable if the foil is processed heavily.

In the process of the present invention, in particular, processing using a tension leveler is preferable. The method using a tension leveler is optimal for the process of the present invention since the tension leveler can easily and reliably maintain the foil flat without any slack and without causing deformation of the through holes.

Figure 6:
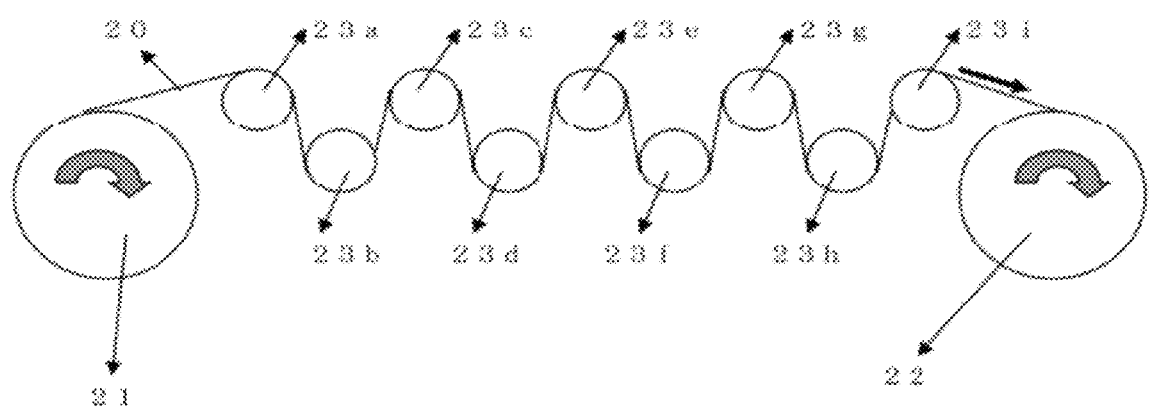
FIG. 6 is a model diagram illustrating one example of a tension leveling apparatus.

The tension leveler itself may be any of known or commercially available machines. For example, as shown in FIG. 6, it is an apparatus having a roller 21 holding the raw foil 20 wound thereon, a take-up roller 22, and correction rollers 23a to 23i disposed between the rollers 21 and 22 for stretching correction and bending correction. Typically, the take-up roller is a driving roller. The raw foil 20 is passed through between the correction rollers to apply appropriate tension so as to impart uniform strain and to promote work hardening, whereby the foil can be provided with predetermined characteristics. The number of correction rollers, the diameter, position (height difference, distance in horizontal direction) or the like of respective rollers may be suitably adjusted. In particular, the unit tension of the tension leveler (i.e., the tension at the take-up roller 22 and rewind roller 21) may be adjusted to provide the foil with desired characteristics. The unit tension may be suitably changed in accordance with the characteristics (such as foil thickness and air permeability) of the raw foil being used and the desired yield strength or the like. Typically, it may be within the range of 1 to 20 N/10 mm.

EXAMPLES

Practical examples and comparative examples will be shown below to explain the characteristics of the present invention in more specific terms. However, the scope of the present invention is not limited to the practical examples.

A. Practical Examples According to Embodiment 1

Various physical properties were measured as follows:
(1) Tensile Strength
A tensile test was carried out using a tensile test machine according to JIS-B-7721 to determine tensile strength. Samples of 10 mm width and 150 mm length were fixedly set in the machine with a distance of 50 mm between chucks, and mean values were calculated from ten measurements with a tension speed of 10 mm/min.
(2) Breaking Elongation (Elongation)
Elongation of the samples when ruptured in the tensile strength test in (1) above was determined.
(3) Air Permeability
Air permeability was measured by an air permeability test method using a Gurley type densometer according to JIS-P-8117.

(4) Percentage of Volume Occupied by Vertical Through Holes of Perforated Aluminium Foil (after Etching Process)

Figure 2:
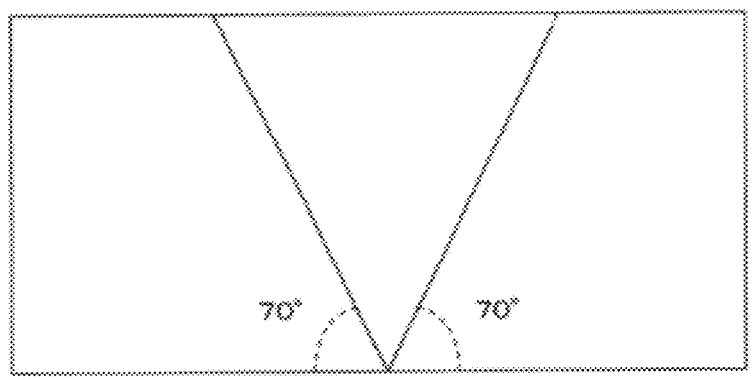
FIG. 2 is a model diagram of a transparent card for observing etch pits having a predetermined angle.

Samples (10 mm width) of perforated aluminium foil after the etching process are embedded in epoxy resin such that an LT-ST plane (cross section perpendicular to the rolling direction) is the observation surface, and the samples are buffed (ground with diamond). After that, the aluminium portion is dissolved by electrolysis (under the conditions with a solution of ethanol:perchloric acid=4:1, 0° C., constant voltage (20 V) electrolysis×180 sec), and etch pits (resin portions that have entered into etch pits) are observed using a scanning electron microscope (SEM). Photographs of randomly selected 10 fields of view are taken (at 500× magnification), and a section of photographs with a measurement length of 100 mm as shown in FIG. 1 is selected for each sample. A transparent card for measuring angles as shown in FIG. 2 is then overlapped on the photograph, and the number of through holes having an angle in the range of 70 to 110 degrees (90±20 degrees) from the lower surface is determined. The total number of through holes is visually counted, to calculate the ratio of the number of angled through holes to the total number as the percentage of volume occupied by vertical through holes (%).

The percentage of volume occupied by vertical through holes of the foil after the embossing process can be likewise calculated by preparing the samples such that portions that are not subjected to the embossing process will be the observation surface.

(5) Inner Diameter of Through Holes

Photographs of randomly selected 10 fields of view are taken similarly to (4) above except that the magnification is 5000×, and an area of the photograph with a measuring area of 100 mm×100 mm is subjected to image analysis for each sample to determine the number of etch pits and the total area of etch pits. Assuming that the through holes are circular, their inner diameter is then calculated. For the image analysis, a multi-purpose high-speed image analyzer "PCA11" (SYSTEM SCIENCE CO., LTD.) was used.

(6) Surface-Area Increase Ratio (Surface Increase Rate)

The perforated aluminium foil after the etching process is immersed in an anodic oxidation solution (5% adipic acid ammonium solution) of 60° C. and an anodic oxidation treatment is performed at 10 V to form an anodic oxide film. Capacitance is measured using an LCR meter, and the surface-area increase ratio is calculated from the capacitance ratio of aluminium foil before the etching. The measurement projection area was 5 cm×10 cm.

(7) Through Hole Density (Percentage of Through Holes)

The number of etch pits is determined by image analysis similarly to (5) above to calculate the density of through holes. For the image analysis, a multi-purpose high-speed image analyzer "PCA11" (SYSTEM SCIENCE CO., LTD:) was used.

(8) Embossed Foil Thickness and Embossing Depth

The thickness of embossed foil was measured using a micrometer with a 5 mm diameter or more, which is a thickness gauge with a flat surface. The value of (embossed foil thickness)−(foil thickness before the embossing) was determined as the embossing depth.

(9) Wrinkle Occurrence Determination

Figure 5:
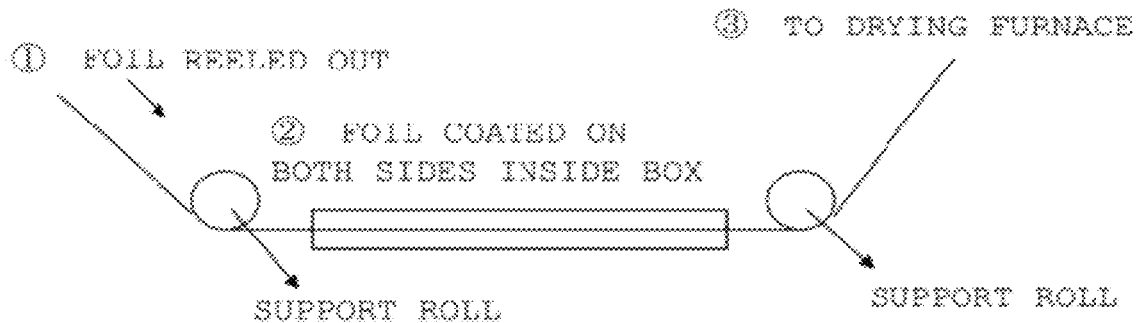
FIG. 5 is a schematic view of an apparatus used for determining occurrence of wrinkles in practical examples.

Occurrence of wrinkles in the foil coated with active materials was determined as follows. Using a two-sided die coater with a 2 m distance between support rolls as shown in FIG. 5 (two rollers in FIG. 5), the foil was coated with a slurry (with a solid concentration of 30%) of active materials containing 90 mass % of activated carbon having a specific surface area of 2000 m$^2$/g and a mean particle diameter of 6 μm and 10 mass % of PTFE (polytetrafluoroethylene) kneaded with ethanol, such that the coating thickness after drying would be 70 μm on one side. The coating speed was 3 m/min, and the foil was visually observed near the exit-side support roll for determining occurrence of wrinkles. After 35 minutes (about 100 m) of observation, foils in which no wrinkles were found were judged as "○", those in which a wrinkle was found even once were judged as "Δ", and those in which wrinkles were frequently found were judged as "X".

Production Example 1-1

Molten metal having the composition of 18 ppm by weight of Fe, 20 ppm by weight of Si, 25 ppm of Cu, and the remainder of Al and incidental impurities was prepared, and solidified to produce ingots. Next, the ingots were subjected to heat treatment for uniformization at 500° C. for 10 hours. After that, the ingots were hot-rolled (at 400° C.) and cold-rolled to a thickness of about 65 μm. Intermediate annealing was performed at 250° C. for 8 hours, followed by further cold rolling to obtain 50 μm thick foil. After cleaned with an organic solvent cleaning agent (isopropylene), the foil was subjected to annealing in argon gas at 500° C. for 10 hours. Next, DC etching was performed using an aqueous solution of 5 weight % hydrochloric acid as the electrolytic solution at a temperature of 70° C. and with a current density of 0.3 A/cm$^2$, to obtain a perforated aluminium foil having a plurality of penetrating etch pits (through holes). The perforated aluminium foil thus obtained had a foil thickness of 50 μm, a tensile strength of 13.2 N/10 mm, elongation of 1.7%, and air permeability of 42 sec/100 ml.

Production Example 1-2

As a perforated aluminium foil before embossing, foil having a foil thickness of 30 μm, tensile strength of 8.3 N/10 mm, elongation of 1.2%, and air permeability of 36 sec/100 ml was fabricated similarly to Production Example 1-1.

Practical Example 1-1

Figure 3:
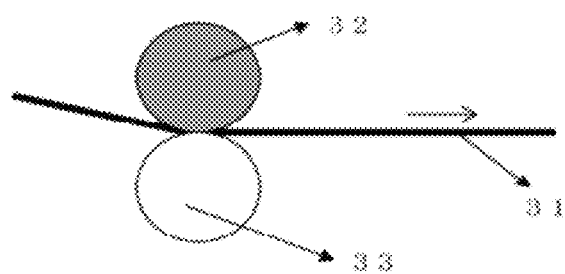
FIG. 3 is a schematic view of an apparatus used for embossing in practical examples.

The perforated aluminium foil obtained as Production Example 1-1 was used as the raw foil, this being embossed using a commercially available embossing machine. The raw foil or Al foil 31, as shown in FIG. 3, was passed through between an upper roll 32 and a lower roll 33 to be embossed. The embossing conditions were as follows: The upper roll 32 was a metal matte roll with an embossing pattern (100 mesh, trapezoidal cups, cup depth 15 μm), the lower roll 33 was a plastic roll (no embossing pattern), the pressure 10 kg/cm$^2$, and the roll speed 20 m/min. Table 1 shows the foil thickness, tensile strength, breaking elongation, air permeability, and judgment results of wrinkle occurrence determination when coated with active materials of the embossed Al foils, while Table 2 shows the percentage of volume occupied by vertical through holes etc.

Practical Example 1-2

Embossed Al foil was obtained similarly to Practical Example 1-1 except that a metal matte roll (150 mesh, trapezoidal cups, cup depth 20 μm) was used as the upper roll. Tensile strength and others of the thus obtained Al foil were measured similarly to Practical Example 1-1. The results are shown in Table 1 and Table 2.

Practical Example 1-3

Embossed Al foil was obtained similarly to Practical Example 1-1 except that perforated aluminium foil obtained as Production Example 1-2 was used as the raw foil. Tensile strength and others of the thus obtained Al foil were measured similarly to Practical Example 1-1. The results are shown in Table 1 and Table 2.

Practical Example 1-4

Embossed Al foil was obtained similarly to Practical Example 1-3 except that a metal matte roll (150 mesh, trapezoidal cups, cup depth 20 μm) was used as the upper roll. Tensile strength and others of the thus obtained Al foil were measured similarly to Practical Example 1-3. The results are shown in Table 1 and Table 2.

Comparative Example 1-1

Physical properties of the perforated aluminium foil of Production Example 1-1 when not subjected to embossing were examined similarly to Practical Example 1-1. The results are shown in Table 1 and Table 2.

Comparative Example 1-2

Physical properties of the perforated aluminium foil of Production Example 1-2 when not subjected to embossing were examined similarly to Practical Example 1-1. The results are shown in Table 1 and Table 2.

B. Practical Examples According to Embodiment 2

Various physical properties were measured as follows:
(1) Yield Strength and Tensile Strength
A tensile test was carried out using a tensile test machine according to JIS-B-7721. Samples of 10 mm width and 150 mm length were fixedly set in the machine with a distance of 50 mm between chucks, and mean values were calculated from ten measurements with a tension speed of 10 mm/min. The stress when the strain was 0.2% was determined as yield strength, and the stress at breaking was determined as tensile strength.
(2) Air Permeability
Air permeability is measured by an air permeability test method using a Gurley type densometer according to JIS-P-8117.
(3) Wrinkle Occurrence Determination
Occurrence of wrinkles in the foil coated with active materials was determined as follows. Using a two-sided die coater with a 2 m distance between support rolls as shown in FIG. 5 (two rollers in FIG. 5), the foil was coated with a slurry (with a solid concentration of 30%) of active materials containing 90 mass % of activated carbon with a specific surface area of 2000 $m^2$/g and a mean particle diameter of 6 μm and 10 mass % of PTFE (polytetrafluoroethylene) kneaded with ethanol, such that the coating thickness after drying would be 70 μm on one side. The coating speed was 3 m/min, and the foil was

TABLE 1

| | Sample No. | Mesh | Embossing depth (μm) | Foil Thickness (μm) | Embossed Foil Thickness (μm) | Tensile strength (N/10 mm) | Elongation (%) | Air Permeability (sec/100 ml) | Judgment |
|---|---|---|---|---|---|---|---|---|---|
| Comparative Example | 1-1 | — | 0 | 50 | 50 | 13.2 | 3.2 | 42 | X |
| Comparative Example | 1-2 | — | 0 | 30 | 30 | 8.3 | 2.4 | 36 | X |
| Practical Example | 1-1 | 100 | 15 | 50 | 65 | 16.3 | 1.6 | 44 | ○ |
| Practical Example | 1-2 | 150 | 20 | 50 | 70 | 18.2 | 1.2 | 43 | ○ |
| Practical Example | 1-3 | 100 | 15 | 30 | 45 | 10.3 | 1.0 | 40 | ○ |
| Practical Example | 1-4 | 150 | 20 | 30 | 50 | 12.5 | 0.8 | 45 | ○ |

TABLE 2

| | Sample No. | Percentage of Volume Occupied by Vertical Through Holes (%) | Through Hole Inner Diameter (μm) | Through Hole Percentage (%) | Surface Increase Rate (times) |
|---|---|---|---|---|---|
| Comparative Example | 1-1 | 75 | 1.5 | 17.2% | 8.3 |
| Comparative Example | 1-2 | 47 | 1.3 | 12.1% | 5.0 |
| Practical Example | 1-1 | 77 | 1.6 | 17.0% | 7.9 |
| Practical Example | 1-2 | 73 | 1.7 | 18.7% | 8.1 |
| Practical Example | 1-3 | 48 | 1.2 | 12.3% | 5.3 |
| Practical Example | 1-4 | 45 | 1.3 | 11.7% | 5.0 |

The results above indicate that embossed Al foils having the predetermined physical properties of the present invention did not suffer occurrence of wrinkles and are therefore suitable as current collectors or the like.

visually observed near the exit-side support roll for determining occurrence of wrinkles. After 35 minutes (about 100 m) of observation, foils in which no wrinkles were found were judged as "○", those in which a wrinkle was found even once were judged as "Δ", and those in which wrinkles were frequently found were judged as "X".

(4) Percentage of Volume Occupied by Vertical Through Holes of Perforated Aluminium Foil (after Etching Process)

Samples (10 mm width) of perforated aluminium foil after the etching process are embedded in epoxy resin such that an LT-ST plane (cross section perpendicular to the rolling direction) is the observation surface, and the samples are buffed (ground with diamond). After that, the aluminium portion is dissolved by electrolysis (under the conditions with a solution of ethanol:perchloric acid=4:1, 0° C., constant voltage (20 V) electrolysis×180 sec), and etch pits (resin portions that have entered into etch pits) are observed using a scanning electron microscope (SEM). Photographs of randomly selected 10 fields of view are taken (at 500× magnification), and a section of photographs with a measurement length of 100 mm as shown in FIG. 1 is selected for each sample. A transparent card for measuring angles such as the one shown in FIG. 2 is then overlapped on the photograph, and the number of through holes having an angle in the range of 70 to 110 degrees (90±20 degrees) from the lower surface is determined. The total number of through holes is visually counted, to calculate the ratio of the number of angled through holes to the total number as the percentage of volume occupied by vertical through holes (%).

(5) Inner Diameter of Through Holes

Photographs of randomly selected 10 fields of view are taken similarly to (1) above except that the magnification is 5000×, and an area of the photograph with a measuring area of 100 mm×100 mm is subjected to image analysis for each sample to determine the number of etch pits and the total area of etch pits. Assuming that the through holes are circular, their inner diameter is then calculated. For the image analysis, a multi-purpose high-speed image analyzer "PCA11" (SYSTEM SCIENCE CO., LTD.) was used.

(6) Surface-Area Increase Ratio

The perforated aluminium foil after the etching process is immersed in an anodic oxidation solution (5% adipic acid ammonium solution) of 80° C. and an anodic oxidation treatment is performed at 10 V to form an anodic oxide film. Capacitance is measured using an LCR meter, and the surface-area increase ratio is calculated from the capacitance ratio of aluminium foil before the etching. The measurement projection area was 5 cm×10 cm.

(7) Percentage of Through Holes

The percentage of through holes s (%)=[(100×measured weight (g))/(foil thickness (cm)×sample area (cm$^2$))]/(specific weight of aluminium (2.70 g/cm$^3$)) was determined. The "foil thickness" is a mean value of thicknesses measured with a micrometer at five points, namely, four corners and the center of samples. The "sample area" is 10 cm×5 cm. The "measured weight" is the weight of samples measured using an electronic scale.

Practical Example 2-1

Molten metal having the composition of 18 ppm by weight of Fe, 20 ppm by weight of Si, 25 ppm of Cu, and the remainder of Al and incidental impurities was prepared, and solidified to produce ingots. Next, the ingots were subjected to heat treatment for uniformization at 500° C. for 10 hours. After that, the ingots were hot-rolled (at 400° C.) and cold-rolled to a thickness of about 65 μm. Intermediate annealing was performed at 250° C. for 8 hours, followed by further cold rolling to obtain 50 μm thick foil. After cleaned with an organic solvent cleaning agent (isopropylene), the foil was subjected to annealing in argon gas at 500° C. for 10 hours. Next, DC etching was performed using an aqueous solution of 5 weight % hydrochloric acid as the electrolytic solution at a temperature of 70° C. and with a current density of 0.3 A/cm$^2$, to obtain a perforated aluminium foil having a plurality of penetrating etch pits (through holes). The perforated aluminium foil thus obtained had a foil thickness of 50 μm, yield strength of 3.5 N/10 mm, tensile strength of 13.2 N/10 mm, and air permeability of 42 sec/100 ml.

Next, the perforated aluminium foil above was used as the raw foil, this being processed with a tension leveler. The tension leveler used here had nine rolls alternately arranged in the up and down direction as shown in FIG. 6, each roll having a diameter of 50 mm. The unit tension was 5 N/10 mm. Table 3 shows the foil thickness, [yield strength/tensile strength], air permeability, and results of wrinkle occurrence determination when coated with active materials of the processed Al foils, while Table 4 shows the percentage of volume occupied by vertical through holes etc.

TABLE 3

| Sample No. | Unit Tension (N/cm) | Foil Thickness (μm) | Yield Strength/Tensile strength (%) | Yield Strength (N/10 mm) | Tensile strength (N/10 mm) | Air Permeability (sec/100 ml) | Wrinkle Occurrence Determination |
|---|---|---|---|---|---|---|---|
| Comparative Example 2-1 | — | 50 | 27 | 3.5 | 13.0 | 42 | Δ |
| Comparative Example 2-2 | — | 30 | 27 | 2.2 | 8.2 | 36 | X |
| Comparative Example 2-3 | — | 20 | 30 | 2.1 | 7.0 | 65 | X |
| Practical Example 2-1 | 5 | 50 | 55 | 8.0 | 14.5 | 44 | ○ |
| Practical Example 2-2 | 8 | 50 | 72 | 10.9 | 15.2 | 37 | ○ |
| Practical Example 2-3 | 3 | 30 | 53 | 4.8 | 9.0 | 45 | ○ |
| Practical Example 2-4 | 5 | 30 | 78 | 7.4 | 9.5 | 38 | ○ |
| Practical Example 2-5 | 3 | 20 | 65 | 5.1 | 7.9 | 67 | ○ |
| Practical Example 2-6 | 5 | 20 | 76 | 6.4 | 8.3 | 66 | ○ |

TABLE 4

| Sample No. | Percentage of Volume Occupied by Vertical Through Holes (%) | Through Hole Inner Diameter (μm) | Surface-Area Increase Ratio | Through Hole Percentage (%) |
|---|---|---|---|---|
| Comparative Example 2-1 | 75 | 1.1 | 8.2 | 18 |
| Comparative Example 2-2 | 54 | 1.0 | 7.6 | 15 |
| Comparative Example 2-3 | 38 | 0.7 | 4.8 | 8 |
| Practical Example 2-1 | 75 | 1.1 | 8.2 | 18 |
| Practical Example 2-2 | 75 | 1.1 | 8.1 | 18 |
| Practical Example 2-3 | 54 | 1.0 | 7.5 | 15 |
| Practical Example 2-4 | 54 | 1.0 | 7.4 | 15 |
| Practical Example 2-5 | 38 | 0.7 | 4.7 | 8 |
| Practical Example 2-6 | 38 | 0.7 | 4.7 | 8 |

Practical Example 2-2

Al foil was produced similarly to Practical Example 2-1 except that the unit tension in the process using the tension leveler was 8 N/10 mm. Table 3 shows the foil thickness, [yield strength/tensile strength], air permeability, and results of wrinkle occurrence determination of the processed Al foils, while Table 4 shows the percentage of volume occupied by vertical through holes etc.

Practical Example 2-3

Perforated aluminium foil (raw foil) of 30 μm foil thickness was fabricated similarly to Practical Example 2-1. This foil had a yield strength of 2.2 N/10 mm, tensile strength of 8.2 N/10 mm, and air permeability of 36 sec/100 ml. Al foil was produced similarly to Practical Example 2-1 except that the unit tension in the process using the tension leveler was 3 N/10 mm. Table 3 shows the foil thickness, [yield strength/tensile strength], air permeability, and results of wrinkle occurrence determination of the processed Al foils, while Table 4 shows the percentage of volume occupied by vertical through holes etc.

Practical Example 2-4

Al foil was produced similarly to Practical Example 2-3 except that the unit tension in the process using the tension leveler was 5 N/10 mm. Table 3 shows the foil thickness, [yield strength/tensile strength], air permeability, and results of wrinkle occurrence determination of the processed Al foils, while Table 4 shows the percentage of volume occupied by vertical through holes etc.

Practical Example 2-5

Perforated aluminium foil (raw foil) of 20 μm foil thickness was fabricated similarly to Practical Example 2-1. This foil had a yield strength of 2.1 N/10 mm, tensile strength of 7.0 N/10 mm, and air permeability of 65 sec/100 ml. Al foil was produced similarly to Practical Example 2-1 except that the unit tension in the process using the tension leveler was 3 N/10 mm. Table 3 shows the foil thickness, [yield strength/tensile strength], air permeability, and results of wrinkle occurrence determination of the processed Al foils, while Table 4 shows the percentage of volume occupied by vertical through holes etc.

Practical Example 2-6

Al foil was produced similarly to Practical Example 2-5 except that the unit tension in the process using the tension leveler was 5 N/10 mm. Table 3 shows the foil thickness, [yield strength/tensile strength], air permeability, and results of wrinkle occurrence determination of the processed Al foils, while Table 4 shows the percentage of volume occupied by vertical through holes etc.

Comparative Example 2-1

Table 3 shows the foil thickness, [yield strength/tensile strength], air permeability, and results of wrinkle occurrence determination of the raw Al foils of Practical Examples 2-1 and 2-2 that were not processed with the tension leveler, while Table 4 shows the percentage of volume occupied by vertical through holes etc.

Comparative Example 2-2

Table 3 shows the foil thickness, [yield strength/tensile strength], air permeability, and results of wrinkle occurrence determination of the raw Al foils of Practical Examples 2-3 and 2-4 that were not processed with the tension leveler, while Table 4 shows the percentage of volume occupied by vertical through holes etc.

Comparative Example 2-3

Table 3 shows the foil thickness, [yield strength/tensile strength], air permeability, and results of wrinkle occurrence determination of the raw Al foils of Practical Examples 2-5 and 2-6 that were not processed with the tension leveler, while Table 4 shows the percentage of volume occupied by vertical through holes etc.

The invention claimed is:
1. A high-strength perforated aluminium foil comprising through holes extending from a front surface to a back surface of the foil, the aluminium foil having:

(1) a foil thickness of 50 μm or less,
(2) a tensile strength of [0.2×foil thickness (μm)] N/10 mm or more, and
(3) a ratio of [yield strength/tensile strength] of 50% or more.

2. The high-strength perforated aluminium foil according to claim 1, having a tensile strength of [0.3×foil thickness (μm)] N/10 mm or more.

3. The high-strength perforated aluminium foil according to claim 1, having a elongation of [0.05×foil thickness (μm)]% or less.

4. The high-strength perforated aluminium foil according to claim 1, having a through hole density of $1\times10^4/cm^2$ or more.

5. The high-strength perforated aluminium foil according to claim 1, having an air permeability of 5 sec/100 ml or more as measured by an air permeability test using a Gurley type densometer according to JIS-P-8117.

6. The high-strength perforated aluminium foil according to claim 1, having through holes with an average inner diameter of 0.2 to 5 μm.

7. The high-strength perforated aluminium foil according to claim 1, having a surface-area increase ratio of [0.10×foil thickness (μm)] or more.

8. The high-strength perforated aluminium foil according to claim 1, having a composition composed of 5 to 80 ppm by weight of Fe, 5 to 100 ppm by weight of Si, 10 to 100 ppm by weight of Cu, and the remainder of Al and incidental impurities.

9. The high-strength perforated aluminium foil according to claim 1, having a ratio [c/t] of a percentage of volume occupied by vertical through holes c (%) to the foil thickness t (μm) of 1.4 or more.

10. The high-strength perforated aluminium foil according to claim 1, wherein the through holes are formed by etching process.

* * * * *